United States Patent Office 3,395,235
Patented July 30, 1968

3,395,235
HALOGENATED KETO ALCOHOLS AND THEIR USE AS NEMATOCIDES
Morton H. Litt, Morristown, N.J., assignor to Allied Chemical Corporation, New York, N.Y., a corporation of New York
No Drawing. Filed June 1, 1964, Ser. No. 371,796
8 Claims. (Cl. 424—331)

ABSTRACT OF THE DISCLOSURE

This invention relates to new halogenated keto alcohols which contain at least two fluorine atoms per molecule and to the utilization of these compounds as nematocides.

---

In accordance with the present invention we have discovered that novel keto alcohols may be prepared by reacting a halogenated acetone containing at least two fluorine atoms with a ketone having a methyl group adjacent to the keto group. These compounds have been found to have a high toxicity to nematodes.

It is therefore an object of the present invention to provide a new class of halogen substituted keto alcohols and a method for their preparation.

A further object is to provide halogen substituted keto alcohols which may be utilized as nematocides.

Additional objects and advantages of the invention will become apparent from the following detailed description thereof.

The halogen-substituted keto alcohols of the present invention are represented by the general formula:

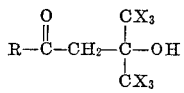

wherein R is a radical selected from the group consisting of hydrocarbon radicals and acylmethyl radicals of the formula

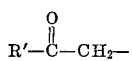

wherein R' is a hydrocarbon radical; and X is a member selected from the group consisting of fluorine and chlorine with total number of fluorine atoms being at least 2.

The keto alcohols of our invention are prepared by the reaction of a halogen hexa-substituted acetone containing at least two fluorine atoms with a ketone having at least one methyl group adjacent to a keto group. The principal reaction which takes place results in a keto alcohol as illustrated by the following equation:

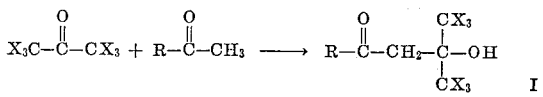

wherein X and R have the meanings given above. Where R is acylmethyl, two keto alcohols are produced, as illustrated by the following equation:

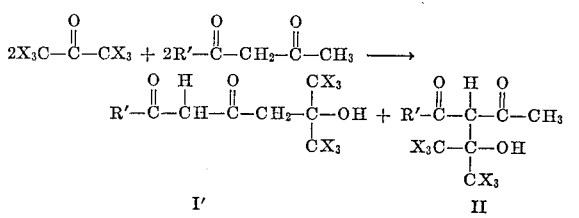

wherein R' and X have the meanings given above.
The ketones preferred for use in the present invention are those in which R in the above ketone formula contains not more than 12 carbon atoms, more particularly where R is an alkyl radical which does not contain more than 10 carbon atoms, and those in which R' does not contain more than 10 carbon atoms. Illustrative of the preferred ketones are acetone, methyl ethyl ketone, the methyl propyl and isopropyl ketones, the methyl butyl ketones, the methylamyl ketones, acetophenone, naphthyl methyl ketone, benzyl methyl ketone, the tolyl methyl ketones, acetylacetone, propionyl acetone, cyclohexyl methyl ketone, methyl vinyl ketone, methyl allyl ketone and methyl propenyl ketone. The above compounds are given solely for the purpose of illustration and it will be apparent that there are many other suitable ketones within the scope of the above defined formula. A monovalent straight chain hydrocarbon radical containing one double bond may be present as long as either the radical contains no more than three carbon atoms or there is no terminal unsaturation.

The halogenated acetones suitable for use in the present invention include hexafluoroacetone and all of the chlorinated analogues thereof wherein chlorine atoms are substituted for up to four of the fluorine atoms. Illustrative of such chloro-fluorinated acetones are 3-chloro-1,1,3,3 - pentafluoroacetone; 1,3 - dichloro-1,1,3,3-tetrafluoroacetone; 1,3,3 - trichloro - 1,1,3-trifluoroacetone; 1,1,3,3 - tetrachloro - 1,3 - difluoroacetone and 1,1,1-trichloro-3,3,3-trifluoroacetone.

The reaction between the halogenated acetones and ketones is preferably conducted under substantially anhydrous conditions in order to minimize the occurrence of side reactions. The water in the reactants can be conveniently removed by distillation although other drying methods known in the art may be used if desired.

Generally no catalyst is necessary in order to carry out the reaction. A number of catalysts including lithium butyl and p-toluene sulfonic acid, were tried with no appreciable effect on the reaction.

The molar proportion of the halogenated acetone and the ketone employed in the reaction is not critical and an excess of either may be used depending on the cost of the reactants and the ease of recovery of the excess reactant. The reaction may be carried out at a temperature of about 20° C. to 160° C. with particularly good results being obtained with the temperature range of about 60° C. to 120° C. Below about 20° C. the rate of reaction becomes excessively slow while above about 160° C. decomposition products begin to appear.

The reaction is preferably conducted without a solvent. However, if greater control of the reaction is desired, the reaction may be slowed down by diluting the reactants in an inert solvent such as toluene, benzene, xylene, pentane, hexane and petroleum ether.

The following examples are given to further illustrate the invention but it is to be understood that the invention is not to be limited in any way by the details described therein. In the examples the parts are by weight.

Example 1

8.7 parts acetone were distilled in a thoroughly dried reaction vessel. In a similar manner 29.85 parts of dichlorotetrafluoroacetone were added to the reaction vessel and the vessel was cooled in a Dry Ice bath. At this point 0.3834 part of 15.27% by weight lithium butyl in hexane were added. The reaction mixture was removed from the Dry Ice bath and maintained at room temperature for 16 hours and then at 60° C. for 104 hours. A precipitate appeared which was removed by filtration. The filtrate was collected and distilled at 62° C. under 3 mm. Hg pressure to yield 1-chloro-1,1-difluoro-2-hydroxy-2-(chlorodifluoromethyl)-4-pentanone.

The product was obtained in a yield of 64% and possessed a refractive index $n_D^{25}$ 1.4075.

Theoretical: H, 2.34%; C, 28.0%; Cl, 27.61%. Found: H, 2.8±0.23%; C, 28.6±0.12%; Cl, 25.8±0.04%.

Example 2

41.8 parts of dichlorotetrafluoroacetone were distilled into a reaction vessel to which 0.1148 part of p-toluene sulfonic acid had been added. In a similar manner 4.06 parts of acetone were added. The vessel was sealed and kept at room temperature for 4 hours, at 60° C. for 96 hours and at 100° C. for 40 hours. The material was distilled on a spinning band column. The material distilled at 62° C. and 1.5 mm. Hg. The product, 1-chloro-1,1-difluoro-2-hydroxy-2-(chlorodifluoromethyl) - 4-pentanone had a refractive index and $n_D^{25}$ 1.4075.

Example 3

39.8 parts dichlorotetrafluoroacetone were distilled into a reaction vessel. In a similar manner 5.8 parts of acetone were added and the vessel was sealed. The reaction was run at 60° C. for 83 hours and then at 100° C. for 136 hours. The material was distilled at 63° C. under 1.5 mm. Hg pressure. 17.4 parts distilled over at this temperature and pressure. The product, 1-chloro-1,1-difluoro-2-hydroxy-2-(chlorodifluoromethyl)-4-pentanone had a refractive index of $n_D^{25}$ 1.4075.

Example 4

15 parts of acetylacetone were pipetted into a reaction vessel. The vessel was degassed and 29.8 parts of dichlorotetrafluoroacetone were distilled into the vessel. The vessel was sealed and the reaction was run at 60° C. for 116 hours and then at 100° C. for 120 hours. The product was distilled and two reaction products were recovered: 1 - chloro-1,1-difluoro-2-hydroxy-2(chlorodifluoromethyl)-3-acetyl-4-pentanone. B.P.=58° C./0.1 mm. Hg refractive index $n_D^{25}$ 1.4475.

The structure was checked by elemental analysis:
Theoretical: H, 2.68%; C, 32.1%; Cl, 23.7%. Found: H, 2.8±0.18%; C, 34.5±0.18%; Cl, 25.3±0.16%.

1 - chloro - 1,1 - difluoro-2-hydroxy-2-(chlorodifluoromethyl)-4,6-heptadione. B.P.=67° C./0.09 mm. Hg, refractive index $n_D^{25}$ 1.4558.

The structure was checked by elemental analysis:
Theoretical: H, 2.68%; C, 32.1%; Cl, 23.7%. Found: H, 3.1±0.22%; C, 32.9±0.29%; Cl, 24.08±0.02%.

Example 5

12 parts acetophenone were pipetted into a reaction tube. The tube was degassed, and 16.6 parts hexafluoroacetone were distilled into the tube. The tube was sealed and the reaction was run at room temperature for 16 hours. The product of the reaction was washed in aqueous sodium hydroxide solution. The excess acetophenone was extracted with benzene. The base soluble portion after acidification was distilled on a spinning band column. The product, 1,1,1 - trifluoro-2-hydroxy-2-(trifluoromethyl)-4-phenyl-4-butanone distilled at 53° C. and 0.5 mm. Hg pressure. The refractive index $n_D^{19}$=1.4467.

The structure was checked with infra red and elemental analysis:
Theoretical: H, 2.8%; C, 46.2%. Found: H, 3.17±.03%; C, 46.23±.22%.

Example 6

10.5 parts of methyl vinyl ketone were distilled into a reaction vessel. In a similar manner 29.8 grams of dichlorotetrafluoroacetone were added to the vessel. The vessel was sealed and the reaction was run at 60° C. for 114 hours and then at 100° C. for 62 hours. The reaction product was fractionally distilled to obtain 1-chloro-1,1 - difluoro-2-hydroxy - 2 - (chlorodifluoromethyl) - 5-hexen-4-one. The structure was checked by elemental analysis:

Theoretical: H, 2.23%; C, 31.2%; Cl, 26.4%. Found: H, 3.0±0.26%; C, 33.1±0.12%; Cl, 24.9±0.10%.

Example 7

The reaction product of hexafluoroacetone and acetophenone, 1,1,1-trifluoro-2-hydroxy-2-(trifluoromethyl)-4-phenyl-4-butanone was tested on "saw paste nematodes" (*Panagrellus redivivus*) using the method of Schuldt and Bluestone [Contrib. Boyce Thompson Inst. vol. 19, p. 65 (1957)] at several dosages. Results obtained are tabulated below:

| Parts per million: | Percent kill after 7 days |
| --- | --- |
| 100 | 100 |
| 50 | 90 |
| 25 | 50 |
| 10 | 5 |

These results indicate that the compound tested is toxic to nematodes.

It will be apparent that many modifications and variations may be effected without departing from the scope of the novel concepts of the present invention and the illustrative details disclosed are not to be construed as imposing undue limitations on the invention.

I claim:

1. A halogenated keto alcohol of the formula

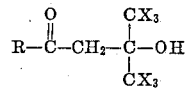

wherein R is selected from the group consisting of alkyl of up to 10 carbon atoms, phenyl, naphthyl, benzyl, tolyl, cyclohexyl, allyl, propenyl and a radical of the formula

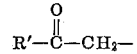

wherein R' is an alkyl group of up to 10 carbon atoms, and X is a halogen selected from the group consisting of fluorine and chlorine with at least two fluorine atoms being present.

2. A halogenated keto alcohol of the formula:

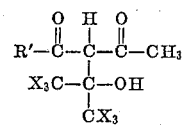

wherein R' and X have the meanings as defined according to claim 1.

3. 1 - chloro - 1,1 - difluoro - 2 - hydroxy - 2 - (chlorodifluoromethyl)-4-pentanone.

4. 1,1,1 - trifluoro - 2 - hydroxy - 2 - (trifluoromethyl)-4-phenyl-4-butanone.

5. 1 - chloro - 1,1 - difluoro - 2 - hydroxy - 2 - (chlorodifluoromethyl)-4,6-heptadione.

6. 1 - chloro - 1,1 - difluoro - 2 - hydroxy - 2 - (chlorodifluoromethyl)-3-acetyl-4-pentanone.

7. 1 - chloro - 1,1 - difluoro - 2 - hydroxy - 2 - (chlorodifluoromethyl)-5-hexen-4-one.

8. A method of combatting nematodes which comprises applying the compounds of claim 1 to said nematodes' habitat.

References Cited

UNITED STATES PATENTS 1,926,567   9/1933   Schaack _____ 260—594 X

OTHER REFERENCES

Chemical Abstracts, vol. 56: 14036 (1962).

ALBERT T. MEYERS, *Primary Examiner.*

V. C. CLARKE, *Assistant Examiner.*